UNITED STATES PATENT OFFICE.

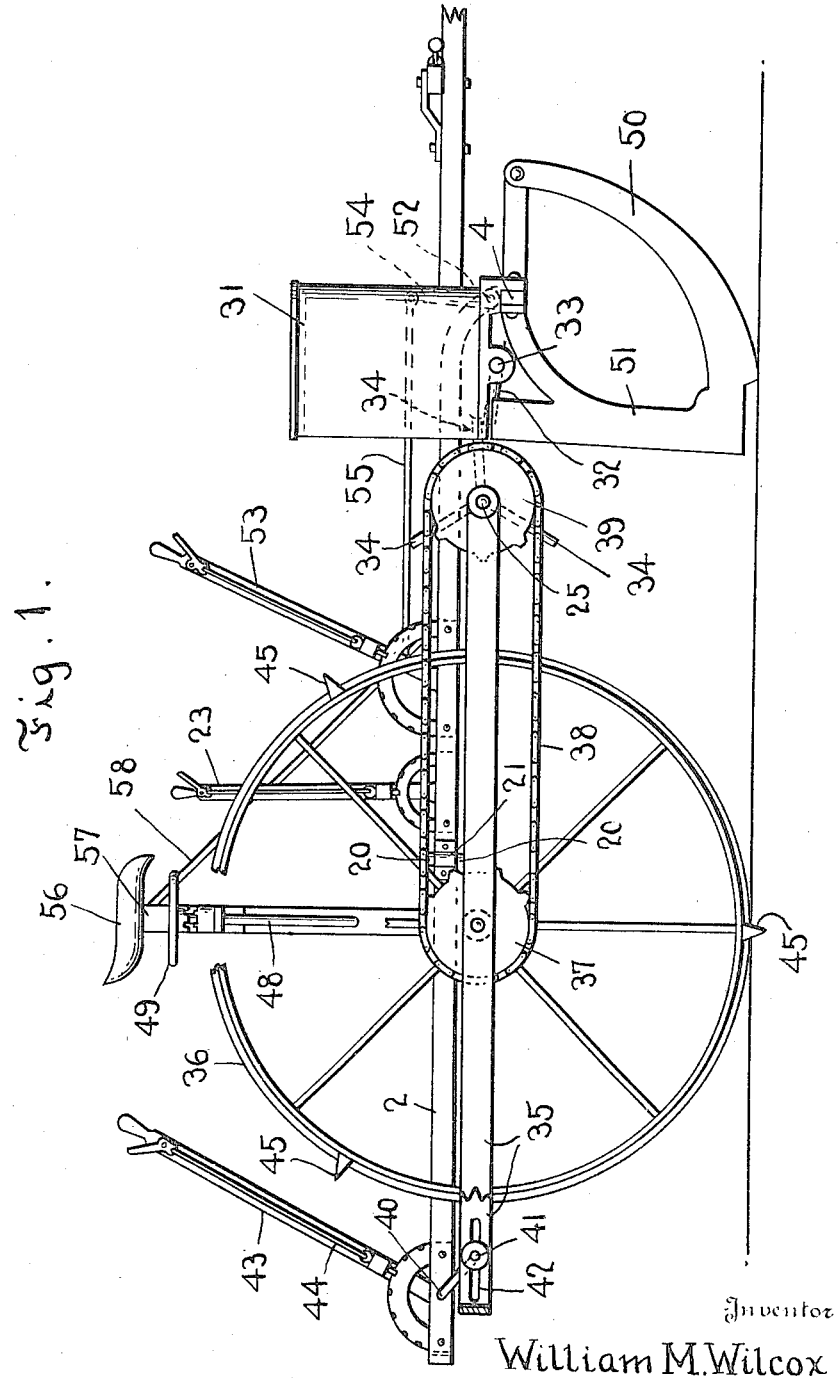

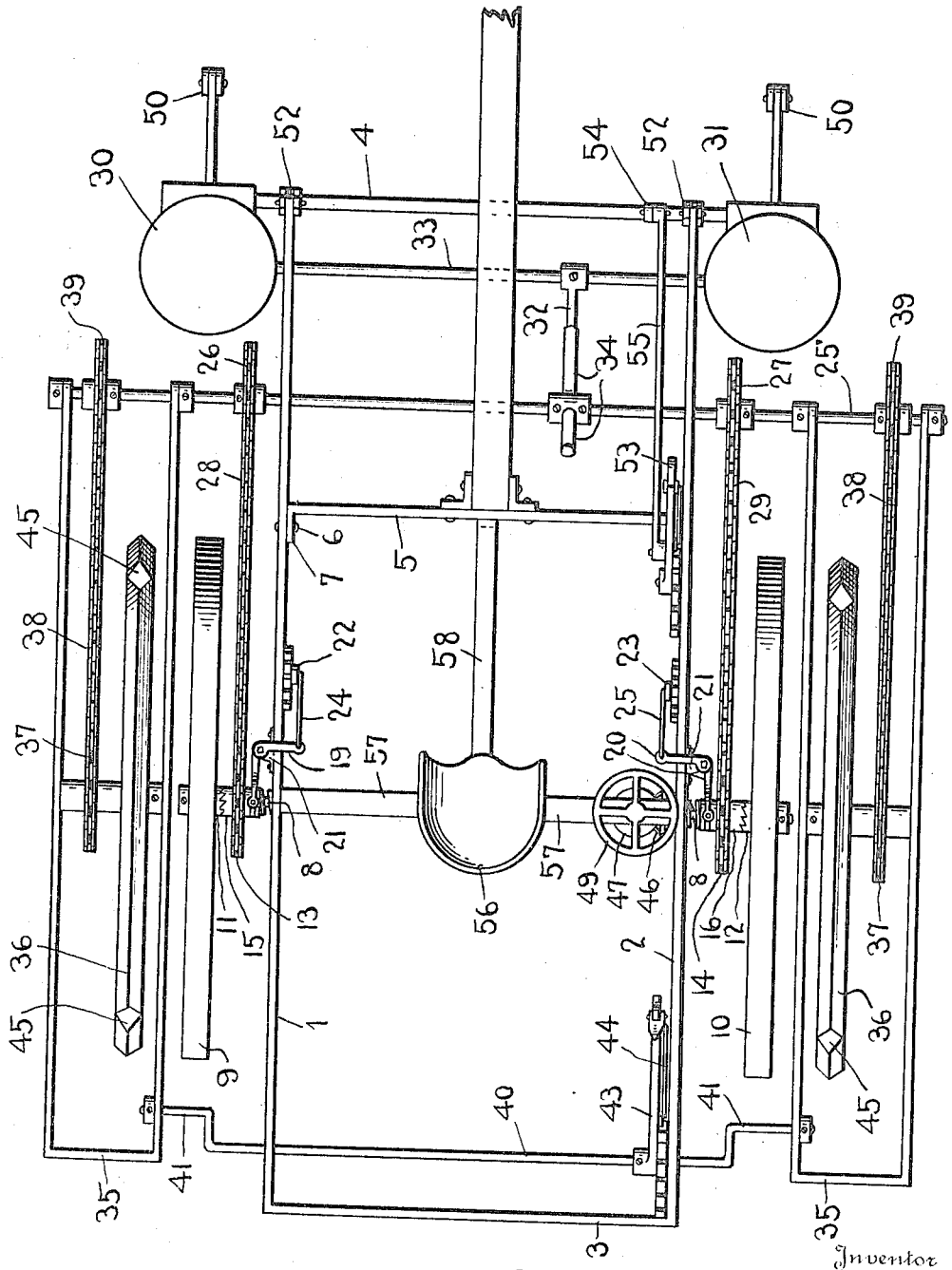

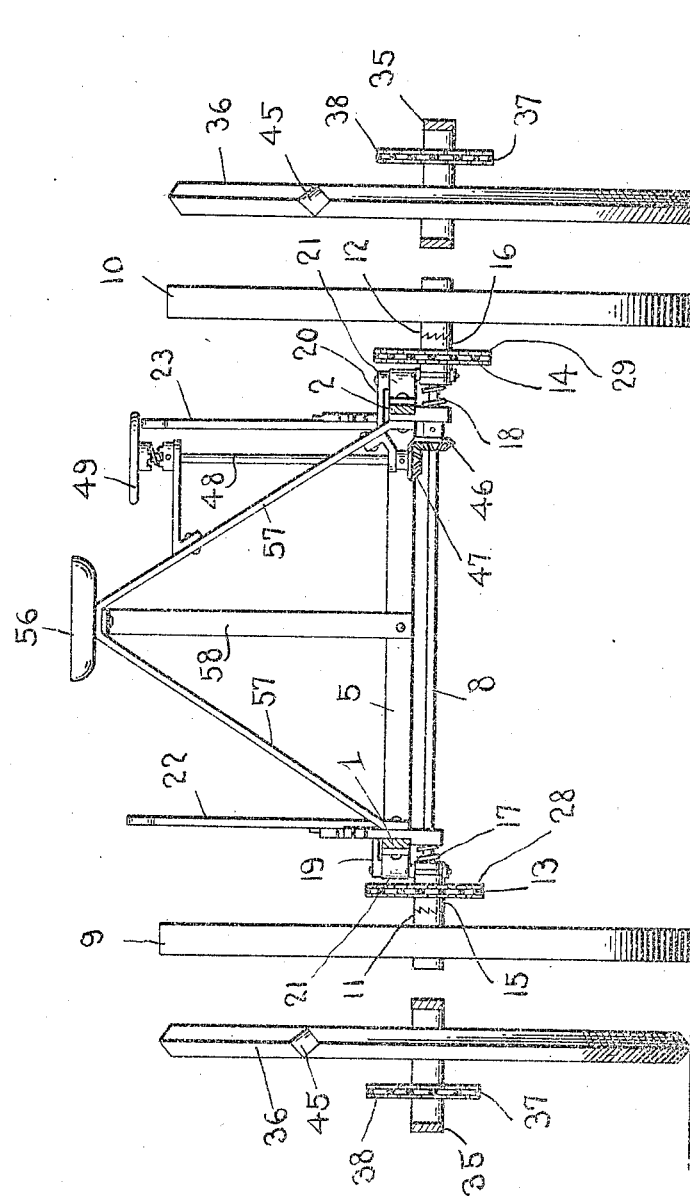

WILLIAM M. WILCOX, OF KILBOURNE, ILLINOIS.

CORN-PLANTER.

1,234,592.   Specification of Letters Patent.   Patented July 24, 1917.

Application filed March 9, 1916. Serial No. 83,080.

*To all whom it may concern:*

Be it known that I, WILLIAM M. WILCOX, a citizen of the United States, residing at Kilbourne, in the county of Mason and State of Illinois, have invented certain new and useful Improvements in Corn-Planters, of which the following is a specification.

This invention relates to new and useful improvements in grain planters, and has for its primary object to provide a grain planter in which the hopper mechanism is operated to deposit the grain at spaced intervals throughout the field.

A further object of the invention is to provide a device of this character in which the timing mechanism is operated without the use of a knotted wire stretched across the field.

A further object of the invention is to provide a device of this character in which the hopper mechanism actuating mechanism is capable of being adjusted any place throughout the field.

A further object of the invention is to provide mechanism by which the hopper mechanism operating mechanism may be thrown out of driving connection during the transportation of the machine from place to place.

Referring to the drawings;

Figure 1 is a side elevation of the machine;

Fig. 2 is a top plan view thereof; and

Fig. 3 is a rear elevation partly in section of the machine.

Referring more particularly to the drawings, the machine comprises a rectangular frame composed of two parallel side members 1 and 2 suitably connected by means of a transverse end member 3 at one end, and by a transverse member 4 at the opposite end, and near the end connected by the transverse member 4 is a transverse brace 5 suitably secured within the frame by means of rivets 6 which pass through the right angular portions 7 of the brace member 5.

Mounted for rotation in the side members 1 and 2 of the rectangular frame is a shaft or axle 8, and carried by said shaft or axle 8 on each end thereof are wheels 9 and 10 which form the traction wheels of the machine.

The inner face of the hub of each of said traction wheels 9 and 10 is provided with clutches 11 and 12 respectively, and rotatably mounted on the axle on the exterior of the frame and adjacent each of said traction wheels 9 and 10 are sprocket wheels 13 and 14, each of which is provided with clutch members 15 and 16 respectively, and the clutch members 15 and 16 are retained in engagement with the clutch members 11 and 12 respectively by means of coil springs 17 and 18 which exert a pressure in the outward direction for the purpose mentioned.

The clutch members 15 and 16 are operated by means of bell crank levers 19 and 20 which are pivoted to brackets 21 carried on the outer face of the side members 1 and 2 of the rectangular frame, and connecting said bell crank levers with operating handles 22 and 23 are links 24 and 25, said handles 22 and 23 forming the means by which said clutch members 15 and 16 are disengaged with the clutch members 11 and 12.

Extending through the frame near the forward end thereof, is a shaft 25, and mounted on said shaft in alinement are the sprocket wheels 26 and 27 which are suitably keyed to said shaft 25' and are connected to the sprocket wheels 13 and 14 by means of chains 28 and 29. These chains serve to drive the sprocket wheels 26 and 27 for the purpose of rotating the shaft 25' when the clutch members 15 and 16 are in engagement with the clutch members 11 and 12.

Carried by the ends of the transverse member 4 of the rectangular frame are grain hoppers 30 and 31 in which the seed to be planted is carried, said hoppers 30 and 31 being provided with a suitable seed dropping mechanism operated by means of a rock shaft 33 on which is mounted a trigger 32, said shaft being mounted in the side members 1 and 2 of the rectangular frame.

For the purpose of rocking the shaft 33, a plurality of spaced tripping members 34 are rigidly carried on the shaft 25' and are adapted to rotate therewith and engage the trigger 32 in their rotation to operate the seed dropping mechanism of the hopper.

Carried by the shaft 25 on each end thereof is a rearwardly extending rectangular frame 35, and arranged in each of said rectangular frames is a marking wheel 36 which is of the same diameter as the traction wheels 9 and 10, and carried by the hub of each of said wheels is a sprocket wheel 37 around which extends a chain 38, said chain passing over the sprocket wheels 39 carried near the ends of the shaft 25' which extends as aforestated in the forward end of each of the rectangular frames 35. Said sprocket wheels 39 are keyed to the shaft 25' and serve to rotate the same when the marking wheels 36 are in engagement with the ground.

Mounted in the rear end of the rectangular main frame is a shaft 40, the free ends of which are provided with cranks 41, said cranks 41 extending into the elongated slot 42 in the inner side member of each of the rectangular frames 35, and connected to said shafts and adapted to rotate the same is an operating lever 43 which is held in its adjusted positions by latch mechanism 44 common to this type of lever and it will be seen that when the shaft 40 is rotated the crank shaped end thereof raises the rectangular frames 35 to lift the marking wheels 36 out of engagement with the ground.

The marking wheels are provided with three marking projections 45 spaced an equal distance apart around the circumference thereof.

Mounted on the shaft or axle 8 is a beveled gear 46 which in turn meshes with the beveled gear 47 keyed to the lower end of a vertically extending shaft 48 which in turn is operated by a hand wheel 49 for the purpose of setting the hopper actuating mechanism in unison with the marking wheels.

Pivotally secured to the forward portion of the machine and at a point underlying each of said hoppers is a furrow opening shoe 50, the rear portion 51 of which is hollow and forms means for conveying the seed to the furrow which the shoe has opened. These shoes are pivotally supported as at 52, and near the forward end of the machine, a lever 53 is pivoted and connected to a vertical extension 54 carried by the end member 4 of the frame by means of a link 55, and it will be seen that upon operation of the pivoted lever 53, the furrow opening shoes 50 are moved upon their pivotal point 52 to disengage them with the ground.

A seat 56 is positioned over the shaft 8, and is supported by means of the side braces 57 and the forwardly extending brace 58.

In operation when the clutch members 15 and 16 are in engagement with the clutch members 11 and 12, it will be seen that the sprockets 13 and 14 will be driven to operate the shaft 25' and through the medium of the members 34 engaging the trigger 32, the seed dropping mechanism of the hopper will be actuated.

The machine in its course across the field plants the rows of corn, and the marking wheels 36 by rotating upon the ground mark the various hills, and it will be understood that if the members 45 are placed in engagement with the ground at the end of the field in alinement with the marks made by the machine in its previous travel across the field, that in its travel again across the field the hopper mechanism will be actuated when the marking projections 45 are in contact with the ground in alinement with the hills of corn previously planted.

I claim—

A corn planter comprising a main frame, traction wheels carried by the main frame, a shaft carried by the main frame and extending transversely thereof beyond the traction wheels, sprocket wheels carried by said shaft, means adapted for engagement with the traction wheels and connected by driving chains with said sprockets for driving said shaft, a plurality of seed hoppers carried by the main frame, dropping mechanism for said hoppers, means carried by said shaft for operating the dropping mechanism, a rearwardly extending floating frame carried on each end of said shaft, marking wheels carried in each of said floating frames, a sprocket wheel carried by each of said marking wheels, a sprocket wheel carried by each end of said shaft in alinement with the sprocket wheels carried by the marking wheels, chains connecting the sprocket wheels with the sprocket in alinement therewith and carried by said shaft, and means carried by the main frame and engaging the floating frame to elevate them for moving said frame to elevated position to disengage the marking wheels with the ground.

In testimony whereof I affix my signature in the presence of two witnesses.

WILLIAM X M. WILCOX.
his mark

Witnesses:
F. M. MADISON,
J. C. CONKLIN.

Copies of this patent may be obtained for five cents each, by addressing the "Commissioner of Patents, Washington, D. C."